3,111,470
PREPARATION OF POLYMER OF 3,3-BIS-(CHLOROMETHYL)OXETANE
Nelson S. Marans, Adelphi, Md., assignor to W. R. Grace & Co., a corporation of Connecticut
No Drawing. Filed Apr. 7, 1961, Ser. No. 101,336
4 Claims. (Cl. 204—154)

The present invention relates to the polymerization of 3,3-bis(chloromethyl)oxetane, and more specifically to a novel method for converting monomeric 3,3-bis(chloromethyl)oxetane into useful film forming polymers.

Monomeric 3,3-bis(chloromethyl)oxetane has heretofore been polymerized by means of ionic catalysts used in the liquid state. The polymers produced in this manner must be treated to remove the ionic catalyst remaining after the desired amount of polymerization has taken place. Due to the complex physical structure of the polymer, complete separation of the spent catalyst is at best a difficult and often impossible task. In order to circumvent the inherent difficulties encountered in the use of ionic catalysts, it has been suggested that other means of polymer propagation such as irradiation be used in the case of cyclic monomeric compounds having propensity for polymerization. Hence, attempts have been made to polymerize 3,3-bis(chloromethyl)oxetane by irradiating the monomeric material in the liquid phase. It was reasoned that radiation treatment might be an effective way to impart sufficient energy to the cyclic molecule to cause opening of the cyclic chain and to provide the active species required for polymerization. It was found, however, that unlike treatment of the liquid monomer with ionic catalyst, liquid phase treatment of 3,3-bis(chloromethyl)oxetane irradiation did not in fact produce substantial or any polymerization of consequence.

It is therefore an object of the present invention to produce useful film forming polymers from monomeric 3,3-bis(chloromethyl)oxetane.

It is another object of the present invention to provide a method for polymerizing 3,3-bis(chloromethyl)oxetane which does not result in the incorporation of contaminating agents in the polymer produced.

It is a further object of the present invention to provide a method by which 3,3-bis(chloromethyl)oxetane may be effectively polymerized by irradiation.

These and still further objects of the present invention will become readily apparent to one skilled in the art from the following detailed description and specific examples.

In general, the present invention relates to a method for preparing poly-3,3-bis(chloromethyl)oxetane by irradiation which comprises irradiating monomeric 3,3-bis(chloromethyl)oxetane maintained in the solid state.

More specifically, the present invention contemplates a process in which 3,3-bis(chloromethyl)oxetane is first cooled below its melting point of 20° C. and frozen, and subsequently while being maintained in that frozen condition is subjected to an amount of irradiation sufficient to cause polymerization.

Any temperature sufficiently below the melting point of 3,3-bis(chloromethyl)oxetane to maintain the monomer in the solid state during the irradiation step is appropriate for carrying out the present invention. These temperatures may range from as high as 19° C. to as low as −80° C. (which is generally the lowest temperature obtainable by commercial methods). Temperatures should be sufficiently low, however, so that the polymer is maintained in the solid phase during the irradiation step during which the impinging irradiation tends to generate heat and thereby melt the monomer.

The types of irradiation which may be used to activate the monomeric molecule and to produce the polymerizable specie in the case of 3,3-bis(chloromethyl)oxetane may be high energy electrons such as are produced in a Van de Graaff accelerator or a resonance transformer, γ-rays from cobalt 60, beta-rays from $Sr^{90}$, and deuterons, neutrons, protons and alpha particles from nuclear reactors or fuel elements.

During the irradiation of monomeric 3,3-bis(chloromethyl)oxetane the following ring breaking and polymerizing reaction is believed to transpire:

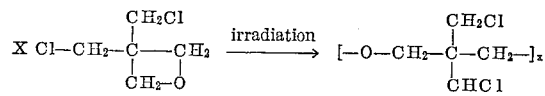

The total yield of polymer obtained in the above reaction is governed to some extent by the total amount of irradiation applied. However, the efficiency of the reaction is also dependent on the rate at which the irradiation is applied and the crystallization of the monomer. It is generally found that irradiating a sample of monomer in a series of small doses produces more polymerization than a single irradiation dose of equal potency. While dosages as high as 5.0 megarads (mr.) delivered in one pass will produce polymerization as envisioned in the present invention, it has generally been found much smaller doses of irradiation in the order of from about 0.05 to about 5.0 mr. delivered in one to ten passes entirely adequate to produce the desired result. In fact, irradiation dosages in excess of about 5.0 mr. do not appear to substantially increase the total amount of polymerization obtained. In adidtion to being generally inefficient, higher irradiation dosages in excess of 5.0 mr. are generally found to generate excessive heat in the frozen monomer sample and thereby tends to cause melting. This melting has been found to completely destroy the efficiency of the polymerization reaction. In adidtion, higher dosages tend to modify the polymer as originally formed.

In general, the irradiation of the monomer is carried out in absence of oxygen to prevent side reactions that interfere with chain-growth. Hence, the irradiation is generally carried out in vacuum or in the presence of an inert atmosphere such as nitrogen.

After the monomer has been irradiated, the resultant polymer may be isolated from the excess monomer by means of filtration or through evaporation of the excess monomer.

Having described the broad general concepts of the present invention the following specific examples are provided to illustrate specific embodiments thereof.

*Example I*

A sample of 3,3-bis(chloromethyl)oxetane was fractionated through a small column to yield center fractions having a boiling point of 38° C. at 0.3 mm. of Hg pressure and a refractive index at 25° C. of 1.4838. Four sample tubes comprising lengths of 10 mm. glass tubing were filled with 2 g. each of the distilled sample. The tubes were then evacuated to 0.3 mm. Hg pressure then sealed. The sealed specimens were then placed on an aluminum plate maintained at a temperature of 13° C. and then frozen. Freezing in some instances was initiated by rubbing a small piece of Dry Ice over the tube. Four tubes were prepared in the above manner and subjected to irradiation dosages varying from 0.5 to 5.0 megarads with a 2 m.e.v. Van de Graaff generator. The number of passes required to achieve a total dosage vary from 1 to 5. The results obtained are listed below. The reduced specific viscosity in dlg.$^{-1}$ was determined in symmetrical tetrachloroethane at 100° C. at 0.1 g./100 ml.

| Sample | Temp. (° C.) | Dosage (mr.) | Dose Rate (mr./pass) | Percent Polymer | M.P. (° C.) | RSV (dlg.$^{-1}$) |
|---|---|---|---|---|---|---|
| 1 | 13 | 0.5 | 0.5 | 5.4 | 145–165 | |
| 2 | 13 | 1.0 | 0.5 | 8.8 | 145–170 | 0.29 |
| 3 | 13 | 3.0 | 1.0 | 11.6 | 145–160 | 0.28 |
| 4 | 13 | 5.0 | 1.0 | 13.8 | 145–164 | 0.23 |

The results above were obtained by opening the tubes subsequent to irradiation, emptying their contents into tared containers, and subsequently evaporating the samples to dryness. The weight of the residue divided by sample weight and multiplied by 100 gave the percentage polymer.

*Example II*

Four more samples prepared in accordance with the procedure set forth in Example I were subjected to irradiation dosages varying from 0.05 to 0.20 megarads. As in Example I, the passes required to obtain the total dosages varied from 1 to 4 with 6 minutes elapsing between each pass. The results obtained for the four samples are tabulated below.

| Sample | Temp. (° C.) | Dosage (mr.) | Dose Rate (mr./pass) | Percent Polymer | M.P. (° C.) | RSV (dlg.$^{-1}$) |
|---|---|---|---|---|---|---|
| 1 | 13 | 0.05 | 0.05 | 2.1 | 140–165 | |
| 2 | 13 | 0.10 | 0.05 | 7.0 | 170–180 | 1.03 |
| 3 | 13 | 0.20 | 0.05 | 12.9 | 170–175 | 1.17 |
| 4 | 13 | 0.20 | 0.05 | 11.0 | 170–175 | 0.99 |

The results obtained in Example II illustrate that amounts of irradiation considerably smaller than that applied in Example I are sufficient to produce under certain conditions substantially the same amounts of polymerization.

*Example III*

Four specimens similar to those prepared in Example I were kept in an unfrozen state at room temperature and subjected to irradiation dosages varying from 0.5 to 5.0 megarads in a manner similar to that followed in the preceding examples. The results obtained for the non-frozen polymer are tabulated below.

| Sample | Temp. (° C.) | Dosage (mr.) | Dose rate (mr./pass) | Percent Polymer | Melting Point (° C.) |
|---|---|---|---|---|---|
| 1 | 25 | 0.5 | 0.5 | 0.08 | liquid. |
| 2 | 25 | 1.0 | 0.5 | 0.16 | Do. |
| 3 | 25 | 3.0 | 1.0 | 0.59 | Do. |
| 4 | 25 | 5.0 | 1.0 | 0.99 | Do. |

From the above, it is seen when the polymer is not irradiated in the frozen state substantially no polymerization takes place.

*Example IV*

The following samples were irradiated at 13° C. to dosages of 0.3 mr. in one pass. The reduced specific viscosities (RSV) were obtained using symmetrical tetrachloroethane at 100° C.

| Sample | Conditions of Handling After Irradiation | Percent Polymer | M.P. (° C.) | RSV (dlg.$^{-1}$) |
|---|---|---|---|---|
| 1 | Melted immediately | 4.6 | 168–172 | 0.52 |
| 2 | Washed with acetone, melted | 4.7 | 162–166 | 0.44 |
| 3 | Stored at 4° C. for 3 days, melted | 5.0 | 167–170 | 0.39 |
| 4 | Stored at 4° C. for 3 days, washed with acetone, melted | 4.7 | 167–172 | 0.42 |
| 5 | Melted, frozen, irradiated at 0.3 mr., and remelted | 7.2 | 165–170 | 0.42 |

The above data indicate that polymers are substantially unaffected by various types of subsequent handling.

*Example V*

The following samples were all irradiated to a total dosage of 0.3 mr. at 13° C., however, the dosage rate was varied. A period of 6 minutes was required for each pass.

| Sample | Dose Rate (mr./pass) | Percent Polymer | Melting Point (° C.) | RSV (dlg.$^{-1}$) |
|---|---|---|---|---|
| 1 | 0.05 | 14.9 | 168–173 | 0.89 |
| 2 | 0.05 | 13.2 | 165–170 | 0.76 |
| 3 | 0.1 | 12.1 | 165–170 | 0.70 |
| 4 | 0.3 | 6.1 | 163–169 | 0.40 |
| 5 | 0.3 | 6.5 | 163–167 | 0.38 |

The above example conclusively illustrates the amount of polymerization is dependent on the dose rate, the lower rate producing the most polymerization for a given dose.

*Example VI*

The following samples were irradiated at 13° C. at various dosages and dose rates. Each irradiation pass required 6 minutes.

| Sample | Dosage (mr.) | Dose Rate (mr./pass) | Percent Polymer | Melting Point (° C.) | RSV (dlg.$^{-1}$) |
|---|---|---|---|---|---|
| 1 | 0.1 | 0.1 | 5.2 | 167–171 | 0.69 |
| 2 | 0.3 | 0.1 | 12.1 | 165–170 | 0.70 |
| 3 | 0.5 | 0.1 | 12.1 | 170–175 | 0.83 |
| 4 | 1.0 | 0.1 | 12.2 | 165–170 | 0.54 |
| 5 | 10.0 | 1.0 | 13.2 | 150–155 | 0.14 |
| 6 | 15.0 | 1.0 | 17.7 | 146–152 | 0.13 |

The above data indicate that a limiting value for polymerization is obtained at about 0.3–1.0 mr. irrespective of dose rate over the range of 0.1–1.0 mr./pass.

The polymers obtained in the practice of the present invention have been found to possess useful film forming properties. Under suitable pressing conditions they have been found to yield translucent, rubbery films having good physical characteristics.

I claim:

1. A method for polymerizing 3,3-bis(chloromethyl)-oxetane which comprises freezing monomeric 3,3-bis-(chloromethyl)oxetane at a temperature below its melting point, irradiating said frozen monomer with high energy ionizing irradiation to induce polymerization therein, and separating the monomeric 3,3-bis(chloromethyl)oxetane from the polymer produced during said irradiation.

2. The method of claim 1 wherein the irradiation consists of high energy electrons delivered in dosages of from about 0.05 to about 15.0 megarads.

3. The method of claim 2 wherein the bis(chloromethyl)oxetane is maintained in the solid state at temperatures of from about 13° C. to about −80° C.

4. The method of claim 2 wherein the irradiation dosage is delivered at a rate of from $1 \times 10^{-2}$ to 20 megarads per minute.

References Cited in the file of this patent

UNITED STATES PATENTS

| 2,722,520 | Hulse | Nov. 1, 1955 |
| 2,895,921 | Price | July 21, 1959 |
| 2,959,531 | Wheelock | Nov. 8, 1960 |
| 2,964,454 | Findley | Dec. 13, 1960 |
| 2,964,455 | Graham | Dec. 13, 1960 |